July 24, 1956  T. R. BLACKBURN ET AL  2,755,570
EXCAVATING MACHINE

Filed Feb. 16, 1953  3 Sheets-Sheet 1

Thomas R. Blackburn
Gordon R. Lynch
INVENTORS

BY Geo. C. Helmig
+ Wm. E. Ford
ATTORNEYS

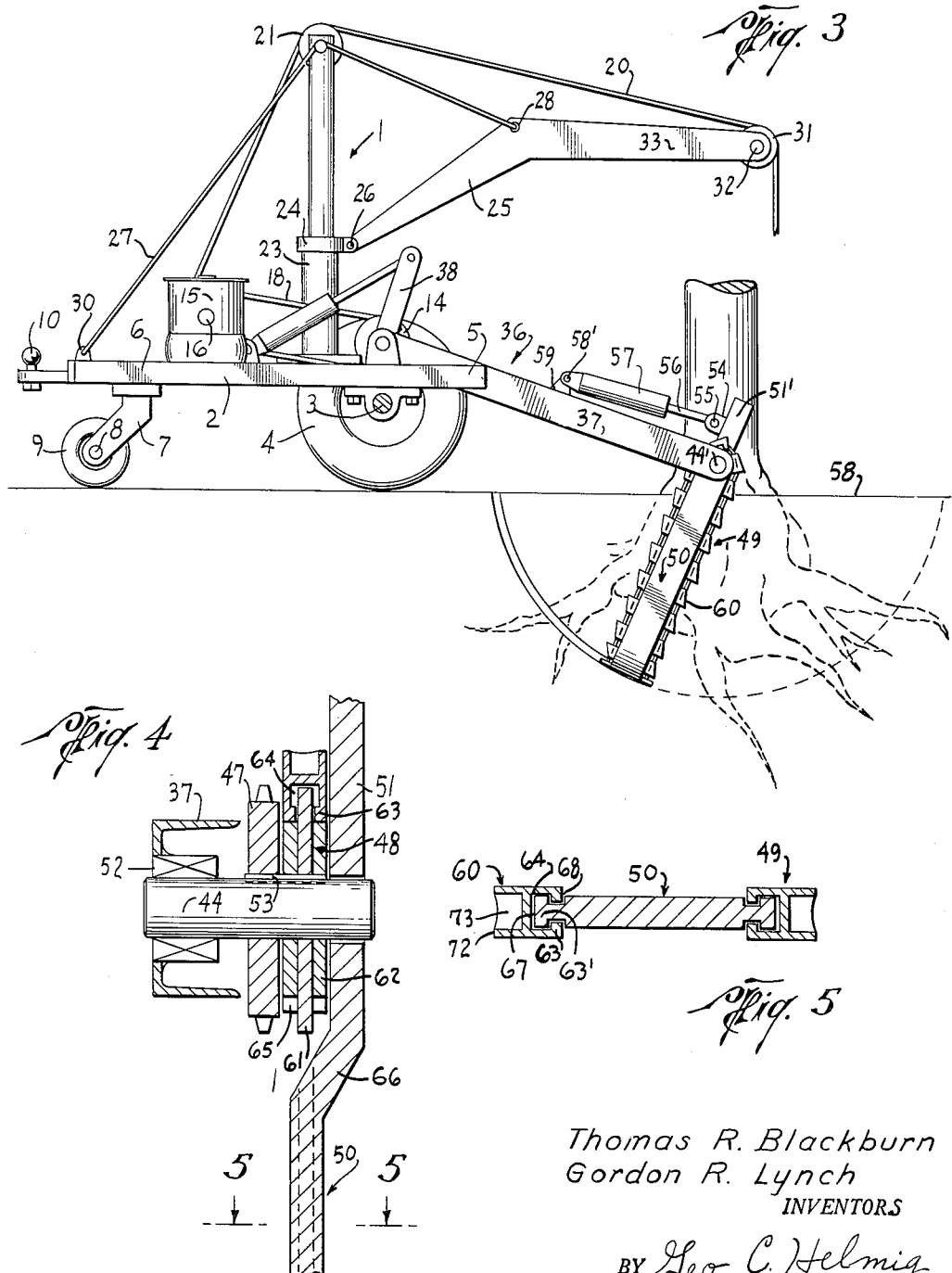

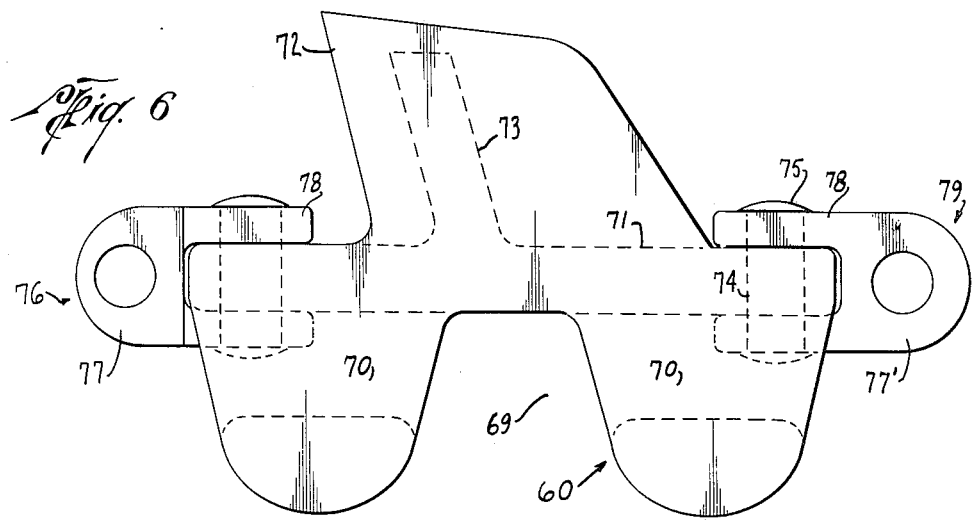
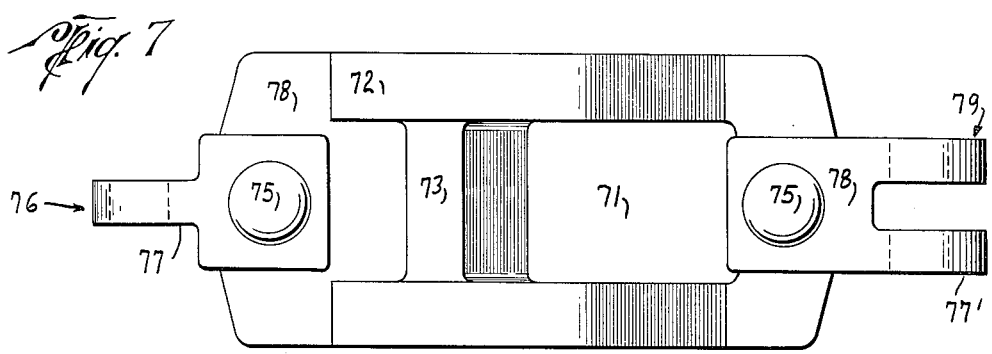
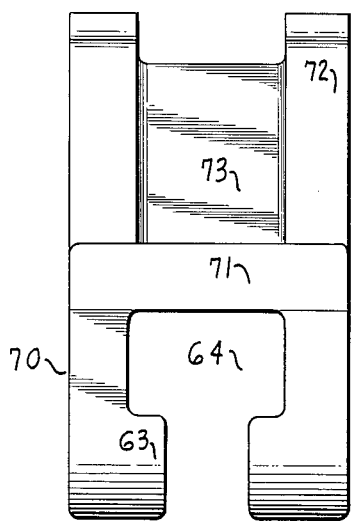

United States Patent Office 2,755,570
Patented July 24, 1956

2,755,570

EXCAVATING MACHINE

Thomas R. Blackburn and Gordon R. Lynch, Bellaire, Tex.; said Lynch assignor to said Blackburn Application February 16, 1953, Serial No. 336,912

2 Claims. (Cl. 37—2)

This invention generally relates to an excavating machine adapted to remove an earth portion of a certain shape from the ground, and more specifically this invention relates to an excavating machine for trees, plants, and the like, such machine being adapted to cut the soil adjacent to and under the tree so that the tree and its soil-encased roots may be lifted from the soil for transportation, the cutting means including an arcuate track movable under the tree and an endless cutting chain movable around the track to positively cut away the soil and objects encountered.

It is therefore an object of this invention to provide a tree excavating machine adapted to move an arcuate track pivoted on the frame of the machine so that the track travels in an arc from the front of the tree, under the tree, and to the rear of the tree, while an endless cutting chain moves around the track to cut away the soil and objects encountered.

It is also an object of this invention to provide an excavating machine of this class having means thereon to automatically lower the endless chain-supporting track to the ground and into excavating position.

It is still another object of this invention to provide a tree excavating machine of this class which includes a boom structure for handling the trees being excavated.

It is yet another object of this invention to provide an excavating machine of this class having an endless cutting chain thereon and a drive means therefor, with the chain segments being universally connected and of a special configuration adapting them to move around the upper and lower sides of the arcuate track band provided therefor.

Other and further objects will be apparent when the specification is considered in connection with the drawings, in which:

Fig. 3 is a side elevation of the excavating machine during the excavating operation;

Fig. 4 is a fragmentary sectional elevation taken along line 4—4 of Fig. 2;

Fig. 5 is a fragmentary sectional view, taken along line 5—5 of Fig. 4;

Fig. 6 is a side elevation of a cutting chain segment;

Fig. 7 is a plan view of a cutting chain segment;

Fig. 8 is an end view of a cutting chain segment.

Figure 1:
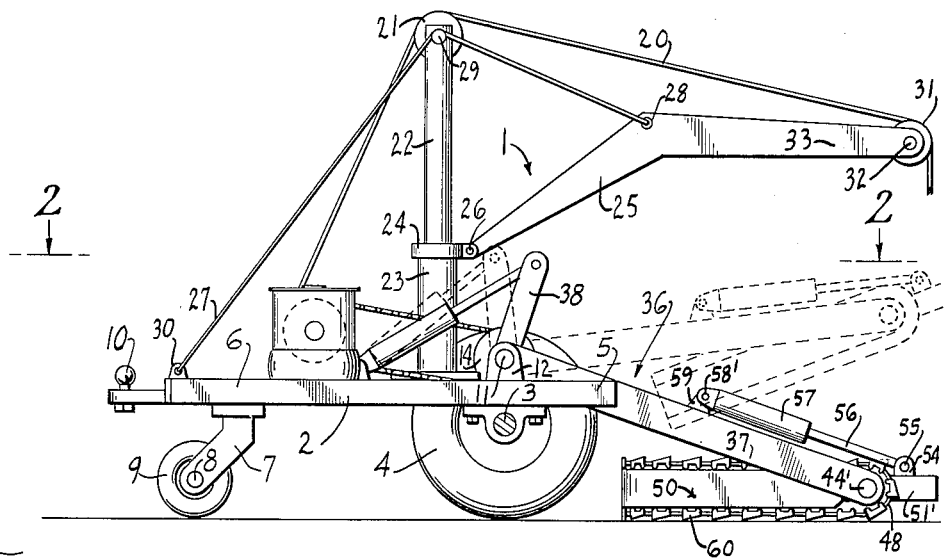
Fig. 1 is a side elevation of the excavating machine, at the beginning of the excavating operation.

As shown in Fig. 1, the excavating machine 1 has a frame 2 with an axle 3 thereon on which is journaled the frame-supporting wheels 4 on the operative end 5 of the machine. Also, on the prime mover connection end 6 there is provided the bracket 7 having thereon the axle 8 on which is journaled the wheel 9. A conventional ball 10 is provided on the end 6 so that a universal joint connection may be made with a prime mover, not shown.

Figure 2:
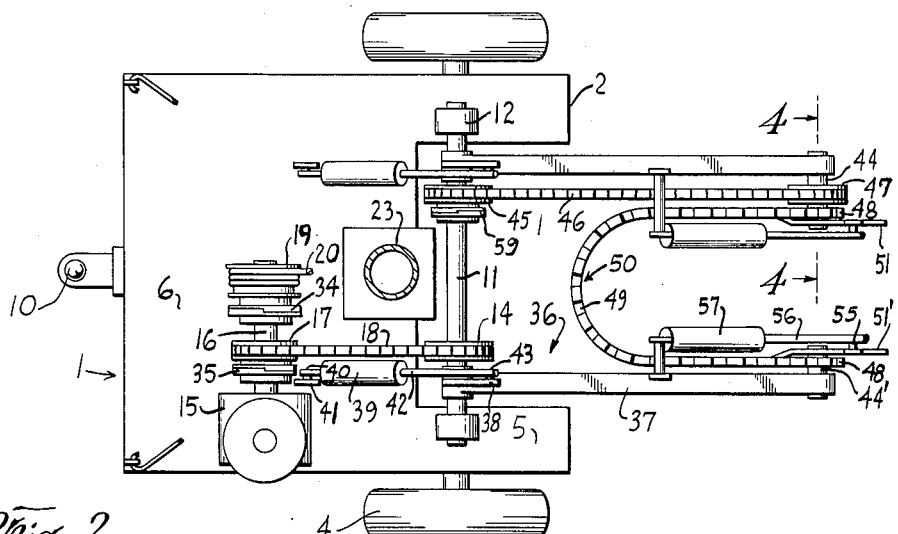
Fig. 2 is a plan view taken along line 2—2 of Fig. 1.

An axle 11, on the operative end 5, of the machine, is journaled in the pillow block bearings 12, and has connected thereto the sprocket 14. As best shown in Fig. 2, an engine 15, which may be a conventional gasoline engine, is mounted on the frame 2, and the drive shaft 16 thereof has the sprocket 17 thereon, and the chain 18 connects such sprocket for driving connection with the sprocket 14.

The shaft 16 is also connected to drive the winch 19, also mounted on the frame 2. From the winch 19 a line or cable 20 extends over the pulley 21 mounted on top of the post 22. This post 22 has a larger diameter lower section 23 to form a shoulder for the ring 24 to which the boom 25 is pivotally mounted at 26. A guy line 27 is connected to the boom at 28 and extends over a roller or pulley 29 on the post 22, and is anchored to the bracket 30 on the frame end 6.

From the pulley 21 the line or cable 20 extends to the pulley 31 which is pivotally mounted at 32 on the boom end 33. From this pulley the cable 20 extends downwardly to be connected to handle a tree to be excavated, as will be hereinbelow described. The clutch 34 on the drive shaft 16 connects the engine 15 to drive the winch 19, and the clutch 35 on such shaft 16 connects the engine 15 to drive the sprocket 17.

A beam means 36 is provided and mounted on the axle 11 therefor, such beam means being shown as comprising two spaced-apart beams 37, each being journaled on the beam axle 11. As shown, an arm 38 is rigidly connected to, or formed integrally with each beam 37. A cylinder 39 is pivotally mounted at 40 to a bracket 41 on the frame 2, and the piston rod 42 of the piston within the cylinder, is pivotally connected at 43 to each arm 38, whereby the parallel beams are interconnected through the fluid pressure actuating system for unisonal swing travel of their outer or free ends in transversely spaced apart vertical paths between a transit position, as shown by dotted lines in Fig. 1, and an operating position just above ground level.

No hydraulic or pneumatic system is shown for actuating the pistons, but it is obvious that any double-acting system may be employed, to let air or liquid under pressure into either end of the cylinders 39, and to let the air or liquid be returned to their systems from the cylinder ends in the direction of which the pistons are moving. Such systems are conventional, and it is therefore considered that the showing of the cylinders and piston rods and their mountings is an ample disclosure.

As regards the beam means 36, it is obvious, also, that a single beam, arm, and cylinder may be employed with the axle 11, and the beams 37 may extend from such axle-pivoted beam means to form a fork or yoke.

Axles 44 and 44' are provided adjacent the outer ends of the beams 37 and extend inwardly therefrom. The sprocket 45 on the axle 11 is connected, by means of the chain 46, to drive the sprocket 47 on one of such axles 44. Such axle 44 and the axle 44' each have the sprockets 48 thereon to serve as the driving sprockets for the cutting chain 49 which travels about the edge faces of the yoke 50, as will be described hereinbelow. As can be seen in Fig. 2, and most clearly in Fig. 4, the yoke 50 is pivotally mounted on the axles 44 and 44' adjacent the yoke ends 51 and 51', respectively.

In Fig. 4, the section taken through the axle 44 shows that such axle is journaled at its outer end in the bearing 52 in the beam 37; that the sprocket 47 is keyed, by means of the key 53, to such axle; that the sprocket 48 is also connected to such axle 44 by the key 53, and that the yoke end 51 of the yoke 50 is pivotally mounted on such axle 44.

In order to position the yoke 50 in position for excavation, the cylinders 39 are operated to project the pistons therein upwardly so that the rods 42 force the arms 38 outwardly, thereby pivoting the beams 37 downwardly.

The yoke 50, adjacent the ends 51 and 51' thereof, has the brackets 54 thereon, to which are pivoted at 55 the piston rods 56, which terminate in pistons, not shown, in the cylinders 57 which are pivotally mounted to studs 58 and 58' which extend inwardly from brackets 59 on the beams 37. These cylinders, like the cylinders 39, may operate with any conventional double-acting fluid system, as has been hereinabove described, and preferably the same source of fluid, as a liquid or compressed air-supplying means, may supply the cylinders 57 as supplies the cylinders 39.

Normally, when the machine is not in operation, or is in transit, the yoke 50 may be maintained by the operation of the cylinders 57, to hold the yoke 50 adjacent to, or parallel with the beams 37, and a releasable support, not shown, may extend between the beams 37, to hold the yoke 50 in such position.

In operation the fluid is admitted to the cylinder ends to cause the yoke 50 to pivot counter-clockwise to the position shown in Fig. 1 to bring it in contact with the ground 58. Then the engine 15 may be started and the clutch 35 operated on the shaft 16, so that, via the sprocket 17, chain 18, sprocket 14, axle 11, clutch 59, sprocket 45, chain 46, sprocket 47, axle 44, and the sprockets 48, the cutting chain 49 is driven about the yoke 50.

Because of this feature of driving the cutting chain 49 to cut away the earth and other objects encountered, and to also displace such earth and objects sidewardly, it is not necessary that the cylinders 57 and the operating fluid systems therefor should be of the prohibitive size which would otherwise be required if the tree excavating yoke alone was no more than a sharpened blade, or a slightly reciprocatory blade, with no movable track of cutting and displacement teeth thereon.

Thus, in this invention, while the fluid cylinder systems of the cylinders 57 are constantly operated to pivot the yoke 50 in the arcuate path shown in Fig. 3, the cutting chain 49 is constantly being moved about the edge faces of the yoke 50, and there is both cutting and displacement accomplished to a much greater degree than can be achieved where no such cutting chain is provided. Thus a portion of earth may be excavated which may have an elliptical base area at the surface of the earth, and which may be of arcuate cross-section, as can be seen by considering Fig. 2 in connection with Fig. 3.

It can also be seen that a shorter yoke than that provided in Figs. 2 and 3 may be provided, with the result that the earth portion excavated may be substantially hemispherical.

The cutting achievable is obtained by providing the yoke 50, sprockets 48, and chain segments 60 of special configurations. As shown in Fig. 4, the sprockets 48, in cross-section, comprise a central plate 61 of a greater diameter than the side plates 62 thereof. Then, since each chain segment 60 has the guide lugs 63 thereon, to ride upon the plates 62, and provide the space 64 inwardly thereof, the segments 60 may drive endwise against the sprocket teeth 65 of the side plates 62 while the control plate 61 prevents the chain segments from being displaced sidewardly from off of the sprockets 48.

Also, the diameters of the sprocket plates and the width and design of the yoke 50 are such that the segments 60 pass from the sprockets to the yoke 50 without difficulty. This can be seen in Fig. 4 by considering that the yoke is offset at 66 adjacent the sprocket 48 so that its end 51 may be pivoted to the axle 44 inwardly of the sprocket 48, whereas the center line through the edge faces of the yoke 50 is aligned with the center line through the central plate 61 of the sprocket 48.

The yoke, adjacent each edge face 67, is of T-shaped cross-section, so that the guide lugs 63 of the chain segments 60 extend into the spaces 68, while the spaces 64 of the segments 60 receive the head 63' of the T-shaped yoke edge cross-section therein. This insures that the chain segments are held positively on the yoke 50 to track therearound.

As can be seen most clearly in Figs. 6–8, the segments 60 have openings 69 between the tracking lugs 70 thereof, and on each side, above the web 71, there extend the cutting teeth 72, which, for strength purposes, are joined together by the gusset 73. Such gusset also serves as a displacing element to urge the cuttings on in the direction of travel of the cutting chain 49.

Because the chain segments 60 must travel the arcuate curvature of the yoke, as well as changing from a straight-path travel along one edge of the yoke, to a curvilinear travel around the sprockets 48 before returning to travel the other edge of the yoke, it is necessary to provide a universal connection between the adjacent chain segments. To this end, a hole 74 is provided through the web 71 at either end thereof through which a clevis pin 75 may extend. Then by providing a clevis 76 having a single outer plate 77, and to spaced-apart inner plates 78, through which the clevis pin 75 extends, and by providing a clevis 79 at the other end of the segment 60, having two spaced-apart inner plates 78, through which the clevis pin 75 extends, and two spaced-apart outer plates 77', the segments 60 may be universally connected from front to rear. This is obviously accomplished by inserting a clevis pin 75 to interconnect the clevises of adjacent segments 60.

If desired, the main frame may have power driven endless road tracks or traction wheels, and the drive motor therefor may be provided with suitable power take-off devices for operating the hydraulic system previously referred to.

An excavating machine of this class is of great advantage where it is necessary to excavate in soil which may have obstructions therein, as rocks, and, obviously obstructions as the outer extensions of the roots of the trees or plants to be excavated. The provision of an endless chain having special cutting teeth thereon is of great benefit, since it is not necessary to move a cutting blade forcibly through such rocks or roots, but, with this type of machine, the cutting teeth of the chain can both cut through the roots and other obstructions, as well as displacing such roots, obstructions, and rocks sidewardly and out of the path of excavation as such excavation progresses.

It is obvious that the usages of the machine of this invention need not be limited to the excavation of the soil supporting a tree or plant, but such machine may also be employed to excavate, in advance, the hole into which the soil portion supporting a tree or plant may be placed in the process of transplantation. Additionally, such machine may be used for other excavating purposes, as where the removal of an earth portion of a predetermined configuration may be advantageous.

Broadly this invention considers an excavating machine adapted to excavate an earth portion of a predetermined configuration by pivoting a cutting means to travel in a vertical arc into the earth and then upwardly while an endless cutting chain traverses the cutting means transversely of the arc of travel to cut away and sidewardly displace the earth and other objects therein.

What is claimed is:

1. In a power saw machine for separating from the ground a balanced earth ball containing the root system of a living tree or the like for minimizing disturbance of the living tree and facilitating later transplanting thereof, a main frame having a power drive shaft mounted thereon, a pair of parallel lever arms fulcrumed on said power shaft to swing in transversely spaced vertical paths and independently of power shaft rotation, a unitary U-shaped saw track located prior to a sawing operation wholly within the transverse space between said lever arms with the uninterrupted bight of the unitary track bridging said space and its opposite ends extending parallel to and inside of the free ends of said lever arms so that the unitary saw track and said lever arms are in vertical nonintersecting relation and the open end of the unitary U-shaped track faces forwardly from the lever arms, a pair of short stub shafts pivotally joining the free ends of said lever arms and the inwardly disposed opposite ends of the U-shaped track on a common transverse axis and inwardly terminating in spaced apart relation to leave the central area within the U-shaped track unobstructed for the reception of a living tree within the forwardly facing open end of the U-shaped track and the pivot axis thereof centered in relation to a tree extending upwardly from the ground above said axis, an endless saw chain entrained on said track, a saw chain engaging idler sprocket carried on one of the stub shafts, a pair of driven sprockets carried by the other stub shaft and connected in tandem fixed relation with each other and one thereof being engaged by the endless saw chain to effect continuous drive thereof in the same direction, a drive sprocket fixed to said power shaft to rotate therewith and positioned in longitudinal alignment with the other of said tandem sprockets and an endless drive transmitting member entrained on the last mentioned sprockets.

2. In a power saw machine for separating from the ground a balanced earth ball containing the root system of a live tree or the like for minimizing disturbance of the root system, a ground supported frame, a pair of transversely spaced arms pivoted on said frame and interconnected with one another to compel their unisonal swinging adjustment in parallel vertical paths to selected height, a unitary U-shaped saw track positioned entirely within the transverse space between and in vertically nonintersecting relation with said arms and with the bight of the unitary track extending continuously across said space from one side to the other thereof and with opposite ends beyond said bight disposed inwardly beside the free end of said arms, means pivotally joining said opposite ends of the unitary saw track with said free ends of the interconnected arms and leaving the open end opposite said bight of the U-shaped track unobstructed for reception therein of a growing tree in centered relation with the axis of said pivot means, an endless saw entrained on the saw track, power means operative on the saw to drive it continuously in the same direction and other power means operative on said unitary U-shaped saw track to swing the same from an initial position in which the unitary U-shaped saw track at its bight end is retracted into nested relation within said pair of interconnected arms and rearwardly in spaced parallelism with the ground surface from said pivot axis with the open track end in tree straddling relation and through an arcuate sweep below the ground surface and returning above the ground surface on the opposite side of the tree where the bight of the unitary saw track will be spaced from the vertical center of the tree a distance substantially equal to the spacing of the bight end from the tree center at the start of the saw cut.

References Cited in the file of this patent

UNITED STATES PATENTS

| | | |
|---|---|---|
| 1,013,173 | Jones | Jan. 2, 1912 |
| 1,485,527 | Raeber | Mar. 4, 1924 |
| 1,607,784 | Spangler | Nov. 23, 1926 |
| 2,068,984 | Jeffrey | Jan. 26, 1937 |
| 2,086,573 | Osgood | July 13, 1937 |
| 2,410,203 | Culley | Oct. 29, 1946 |
| 2,506,662 | Cusenbary | May 9, 1950 |
| 2,542,952 | White | Feb. 20, 1951 |
| 2,630,308 | Moon | Mar. 3, 1953 |
| 2,648,358 | Lower | Aug. 11, 1953 |